US008261252B2

(12) United States Patent
Raghavan et al.

(10) Patent No.: US 8,261,252 B2
(45) Date of Patent: Sep. 4, 2012

(54) METHOD AND SYSTEM FOR AUTOMATED CODE CONVERSION

(75) Inventors: Praveen Raghavan, Tamil Nady (IN); Murali Jayapala, Leuven (BE); Francky Catthoor, Temse (BE); Absar Javed, Leuven (BE); Andy Lambrechts, Leuven (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 1103 days.

(21) Appl. No.: 12/056,174

(22) Filed: Mar. 26, 2008

(65) Prior Publication Data

US 2008/0263530 A1 Oct. 23, 2008

Related U.S. Application Data

(60) Provisional application No. 60/920,226, filed on Mar. 26, 2007.

(51) Int. Cl.
*G06F 9/45* (2006.01)

(52) U.S. Cl. ......... 717/161; 717/140; 717/149; 717/151

(58) Field of Classification Search ........................ None
See application file for complete search history.

(56) References Cited

U.S. PATENT DOCUMENTS

| | | | | |
|---|---|---|---|---|
| 5,202,975 A | * | 4/1993 | Rasbold et al. | 717/151 |
| 5,317,734 A | * | 5/1994 | Gupta | 717/161 |
| 5,557,797 A | * | 9/1996 | Yano | 717/124 |
| 5,742,814 A | * | 4/1998 | Balasa et al. | 1/1 |
| 5,966,534 A | * | 10/1999 | Cooke et al. | 717/155 |
| 7,024,564 B2 | * | 4/2006 | Pavlin et al. | 713/192 |
| 7,296,084 B2 | * | 11/2007 | Thayer et al. | 709/236 |
| 7,814,486 B2 | * | 10/2010 | Papakipos et al. | 718/100 |

(Continued)

FOREIGN PATENT DOCUMENTS

WO  WO 2007/065627 A2  6/2007

OTHER PUBLICATIONS

Absar et al. "Reuse Analysis of Indirectly Indexed Arrays." *ACM Transactions on Design Automation of Electronic Systems.* 11(2):282-305 (2006).

(Continued)

*Primary Examiner* — Isaac Tecklu
(74) *Attorney, Agent, or Firm* — Knobbe Martens Olson & Bear LLP

(57) ABSTRACT

A method and system for converting application code into optimized application code or into execution code suitable for execution on a computation engine with an architecture comprising at least a first and a second level of data memory units are disclosed. In one aspect, the method comprises obtaining application code, the application code comprising data transfer operations between the levels of memory units. The method further comprises converting at least a part of the application code. The converting of application code comprises scheduling of data transfer operations from a first level of memory units to a second level of memory units such that accesses of data accessed multiple times are brought closer together in time than in the original code. The converting of application code further comprises, after the scheduling of the data transfer operations, deciding on layout of the data in the second level of memory units to improve the data layout locality such that data which is accessed closer together in time is also brought closer together in the layout than in the original code.

21 Claims, 5 Drawing Sheets

U.S. PATENT DOCUMENTS

| | | | | |
|---|---|---|---|---|
| 2005/0177697 | A1* | 8/2005 | Oberlaender et al. | 711/170 |
| 2006/0020935 | A1* | 1/2006 | Tran et al. | 717/162 |
| 2006/0031652 | A1 | 2/2006 | Richter et al. | |
| 2006/0112377 | A1* | 5/2006 | Nacul et al. | 717/140 |
| 2006/0212685 | A1 | 9/2006 | Raghavan et al. | |
| 2007/0294663 | A1* | 12/2007 | McGuire et al. | 717/108 |
| 2011/0010715 | A1* | 1/2011 | Papakipos et al. | 718/100 |

OTHER PUBLICATIONS

Allen, R and Kennedy, K. *Optimizing Compilers for Modern Architecture, A Dependence-Based Approach*, 2002, Morgan Kaufmann.

European Search Report for EP 08153186.5, completed on Nov. 27, 2008 and mailed on Dec. 10, 2008.

Kandemir et al. "A Compiler-Based Approach for Dynamically Managing Scratch-Pad Memories in Embedded Systems." *IEEE Transactions on Computer-Aided Design of Integrated Circuits amd Systems*. 23(2):243-260 (2004).

Kandemir et al. "Improving Cache Locality by a Combination of Loop and Data Transformations." *IEEE Transactions on Computers*. 48(2):159-167 (1999).

Kandemir et al. "Improving Whole-Program Locality Using Intra-Procedural and Inter-Procedural Transformations." *Journal of Parallel and Distributed Computing*. 65:564-582 (2005).

Xia et al. "A 0-1 Integer Linear Programming Based Approach for Global Locality Optimizations." *ACSAC*. pp. 281-294 (2006).

\* cited by examiner

METHOD AND SYSTEM FOR AUTOMATED CODE CONVERSION

CROSS REFERENCE TO RELATED APPLICATIONS

This application claims priority under 35 U.S.C. §119(e) to U.S. provisional patent application 60/920,226 filed on Mar. 26, 2007, which application is hereby incorporated by reference in its entirety.

BACKGROUND OF THE INVENTION

1. Field of the Invention

The invention relates to compilers and pre-compilers, also called language re-writers, implementing methods for automated code conversion and to the methods themselves, the methods targeting a computation engine with a predefined architecture.

2. Description of the Related Technology

Before applications can be executed on a computation engine, also called computer system, the source code of the applications needs to be converted into a sequence of instructions, understood by the computation engine. This is performed in a compiler. A compiler is a computer program that translates text written in a first computer language, the source language which usually is a high-level programming language such as e.g. Fortran, Pascal or C, into a second computer language, the target language which usually is a lower level language such as e.g. assembly language or machine language. The input to the compiler is called the source code, and the output is called the object code.

Conversion methods or compilers exist for various computation engines, e.g. traditional compilers for computation engines based on a general purpose processor. Also vendors of other computation engines provide with their device a suitable compiler.

Sometimes, code is rewritten in a same language but in a different form. This is done in a language rewriter or pre-compiler, which is a program that translates the form of expressions without a change of language. This may for example be done to optimize code.

A VLIW (Very Long Instruction Word) processor executes instructions in parallel based on a fixed schedule determined when the program is compiled. Since determining the order of execution of instructions, including which instructions can execute simultaneously, is handled by the compiler, the processor does not need scheduling hardware. As a result, VLIW processors offer significant computational power with limited hardware complexity.

When scheduling instructions, a principle of locality, also called locality of reference, is used. This is the phenomenon that a same value or related storage location is frequently accessed. Different types of locality of reference are to be distinguished. In temporal locality, a resource that is referenced at one point in time is referenced again soon afterwards. In spatial locality, the likelihood of referencing a storage location is greater if a storage location near it has been recently referenced. Programs and systems which exhibit locality exhibit predictable behavior, and thus provide opportunities for designers to improve performance through pre-fetching, pre-computing and caching of code and data for future use.

In computer code, current state of the art techniques, used for example for regular processors like a Very Long Instruction Word (VLIW) processor connected to a scratch pad memory (SPM), exploit locality in only two ways:

1. Temporal Locality of the SPM or the register (register spilling): Prior art temporal locality of the SPM or the register (register allocation) looks at all the data on the scratch pad or the register, respectively, as a whole.
2. Spatial Locality of the SPM or the register: bring data accessed together in space.

The register spilling problem has also been addressed by various research groups. These techniques once again look at singular registers instead of data arrays.

Current state of the art techniques perform optimizations that improve the spatial locality in the SPM only. This process improves the "layout locality" on a smaller part of a SPM in particular the line.

SUMMARY OF CERTAIN INVENTIVE ASPECTS

Certain inventive aspects relate to apparatus or methods for converting application code into optimized application code or execution code.

In a first aspect, the present invention provides a method for automatedly converting application code into optimized application code or into one or more execution codes suitable for execution on a computation engine with an architecture comprising at least a first and a second level of data memory units. The method comprises:

obtaining application code, the application code including data transfer operations between the levels of memory units; in embodiments of the present invention, the data transfer operations may be explicitly present in the code and in other embodiments of the present invention the transfer operations may be implicitly present in the code via data access operations (e.g. high level code such as for example C code, C++ code, system C code, etc.); and converting at least a part of the application code such that data transfer operations between and data layout within the memory units are modified. The modification may include an improvement with respect to energy and/or performance.

The converting process comprises:
(a) scheduling of data transfer operations from a first level of memory units to a second level of memory units such that accesses of data accessed multiple times are brought closer together in time than would be the case in the original code, and thereafter,
(b) deciding on layout of the data in the second level of memory units to improve the data layout locality such that data which is accessed closer together in time is also brought closer together in the layout than would be the case in the original code, whereby process (a) does not decide on the internal organization of at least some of the data transferred, hence fixing the scheduling of data transfer operations only partially while also partially, but not yet fully, fixing the placement of all the data transferred, thereby providing freedom to subsequent process (b).

Put in other words, in accordance with embodiments of the present invention, access locality is performed before layout locality, whereby for data which is accessed again and again, accesses are brought together in time where possible when data transfer operations happen, and data which is accessed one after the other is brought together in space where possible. Therefore, in a first process (access locality) a partial fix is done, giving a range of options, and hence freedom. In a second process (layout locality) one option is picked from the pre-defined range. This picking of one option may be done based on a cost function.

In accordance with embodiments of the present invention, process (b) may effectively use at least part of the additional freedom provided by process (a). In embodiments of the present invention, process (b) may use all additional freedom provided by process (a) to decide on layout of data in the second level of memory units. In alternative embodiments of the present invention, process (b) may use only part of the additional freedom provided by process (a) to decide on layout of data in the second level of memory units, thereby leaving further freedom to further processes, e.g. further access and layout processes.

In accordance of the present invention, process (a) may lead to a plurality of possible schedules of the data transfer operations, and process (b) may further comprise deciding or selecting on some of the schedules of the data transfer operations.

In a method according to embodiments of the present invention, the decision on the internal organization of at least some of the data transferred is based on a cost function. The decision which data transfers to schedule at what moment in time depends on a cost function. A data transfer will not be scheduled if it does not improve the cost function too much.

In embodiments of the present invention, a polyhedral model may be used for the code, and the cost function may be built with values extracted from the polyhedral model. The values extracted from the polyhedral model may be data dependencies and/or data reuse.

In a method according to embodiments of the present invention, data accessed may comprise at least a first and a second group of data and the data layout may be performed on these groups of data.

The architecture may comprise a SPM, a cache or a very wide register (VWR) (see US-2006/212685) having a width, and the group of data may comprise at least one line of data having the width of the SPM, the cache or the VWR.

The architecture may comprise at least one functional unit having a width, and the group of data may comprise at least one word having the width of functional unit, possibly a line.

The architecture may comprise at least one functional unit having a width, and the group of data may comprise at least one sub-word, the width of the functional unit and the sub-words being such that multiple sub-words can operate in parallel in the functional unit (SMD).

In a method according to embodiments of the present invention, the converting process may furthermore comprise, before the process of scheduling of data transfer operations, a process of improving parallelism of the data transfers between the first and the second levels of memory units. The process of improving parallelism of the data transfers between the first and the second levels of memory units may be based on a cost function.

In methods according to embodiments of the present invention, the first level of memory units may be a higher level of memory units than the second level of memory units. In embodiments of the present invention, the architecture may furthermore comprise a third level of memory units, the third level of memory units being lower level than the second level of memory units, wherein the converting process is first performed between the first and second level of memory units, and is thereafter performed between the second and third level of memory units. Here again, the converting process may furthermore comprise, before the process of converting of data transfer operations between the second and the third levels, a process of improving parallelism of the data transfers between the second and the third levels of memory units. The process of improving parallelism of the data transfers between the second and third levels of memory units may be based on a cost function.

In a second aspect, the present invention provides a pre-compiler for automatedly converting application code into optimized application code for execution on a computation engine with an architecture comprising at least a first and a second level of data memory units, the pre-compiler comprising one or more modules for carrying out any of the method processes in accordance with any of the embodiments of the first aspect of the present invention.

Embodiments of the second aspect of the present invention provide a pre-compiler for converting application code into optimized application code for execution on a computation engine with an architecture comprising at least a first and a second level of data memory units. The pre-compiler comprises:
  a module for receiving application code, the application code including data transfer operations between the levels of memory units, and
  a module for converting at least part of the application code.
The module for converting comprises:
  (a) a module for scheduling data transfer operations from a first level of memory units to a second level of memory units such that accesses of data accessed multiple times are brought closer together in time than would be the case in the original code, and
  (b) a module for thereafter deciding on layout of the data in the second level of memory units such that accesses of data which is accessed closer together in time are also brought closer together in the layout than would be the case in the original code,
  whereby the module for scheduling data transfer operations does not decide on the internal organization of at least some of the data transferred, hence fixing the scheduling of data transfer operations only partially while also partially fixing the placement of all the data transferred, thereby providing freedom to the module for deciding on layout of the data in the second level of memory units.

In a third aspect, the present invention provides a compiler for automatedly converting application code into execution code suitable for execution on a computation engine with an architecture comprising at least a first and a second level of data memory units, the compiler comprising a module for carrying out any of the method processes in accordance with any of the embodiments of the first aspect.

Embodiments of the third aspect of the present invention provide a compiler for converting application code into execution code suitable for execution on a computation engine with an architecture comprising at least a first and a second level of data memory units. The compiler comprises:
  a module for receiving application code, the application code including data transfer operations between the levels of memory units, and
  a module for converting at least part of the application code.
The module for converting comprises:
  (a) a module for scheduling data transfer operations from a first level of memory units to a second level of memory units such that accesses of data accessed multiple times are brought closer together in time than would be the case in the original code, and
  (b) a module for thereafter deciding on layout of the data in the second level of memory units such that accesses of data which is accessed closer together in time are also brought closer together in the layout than would be the case in the original code, whereby the module for scheduling data transfer operations does not decide on the internal organization of at least some of the data transferred, hence fixing the scheduling of data transfer operations only partially while also partially fixing the placement of all the data transferred, thereby providing freedom to the module for deciding on layout of the data in the second level of memory units.

In a fourth aspect, the present invention provides a computer program product with program code module to execute the processes in accordance with any of the method embodiments of the first aspect of the present invention when executed on a computation engine having an architecture comprising at least a first and a second level of data memory units. The computer program product may be part of a computer software product (i.e. a carrier medium) that includes one or more code segments that cause a processor such as a CPU of the computation engine to carry out the processes of the method. Embodiments of the present invention also provide such machine readable data storage storing the computer program product of embodiments of the present invention. The terms "carrier medium" and "machine readable data storage" as used herein refer to any medium that participates in providing instructions to a processor for execution. Such a medium may take many forms, including but not limited to, non-volatile media, volatile media, and transmission media. Non-volatile media include, for example, optical or magnetic disks, such as a storage device which is part of mass storage. Volatile media include dynamic memory such as RAM. Transmission media include coaxial cables, copper wire and fiber optics, including the wires that comprise a bus within a computer. Transmission media can also take the form of acoustic or light waves, such as those generated during radio wave and infra-red data communications.

Common forms of computer readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the internet. Transmission media can take the form of acoustic or light waves, such as those generated during radio wave and infrared data communications. Transmission media include coaxial cables, copper wire and fiber optics, including the wires that form a bus within a computer.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of methods and devices in this field, the present concepts are believed to represent substantial new and novel improvements, including departures from prior practices, resulting in the provision of more efficient computer code.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
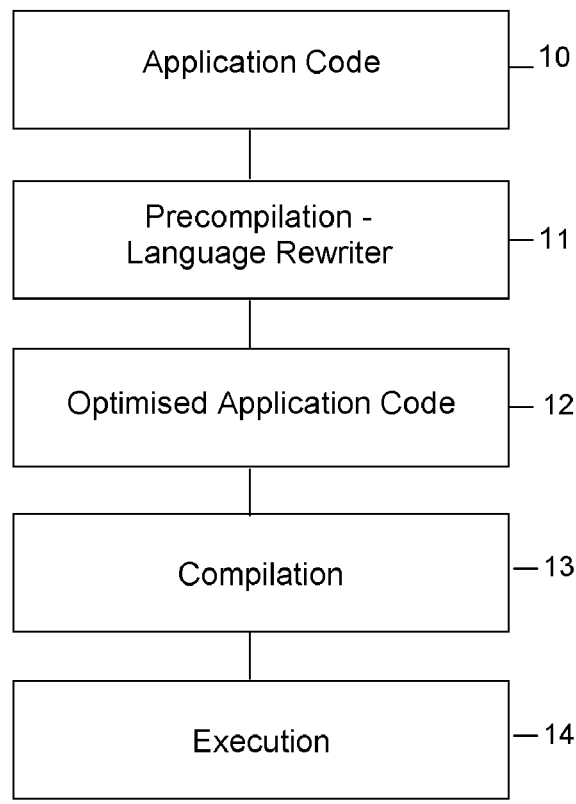
FIG. 1 is block schematic diagram representing a conversion from application code to execution code, where a method according to embodiments of the invention may be implemented in a pre-compiler.

In the different figures, the same reference signs refer to the same or analogous elements.

DETAILED DESCRIPTION OF CERTAIN INVENTIVE EMBODIMENTS

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or processes. It is thus to be interpreted as specifying the presence of the stated features, integers, processes or components as referred to, but does not preclude the presence or addition of one or more other features, integers, processes or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a module for carrying out the method or element of a method. Furthermore, an element described herein of an apparatus embodiment is an example of a module for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

With respect to the present description, access and layout locality are differentiated from temporal and spatial locality as generally known in the art.

The purpose of locality optimization is to reduce the number of unnecessary transfers of data between foreground and background memories. This can be achieved by reordering the accesses such that multiple references to the same data are brought close together in time. A code where multiple accesses of the same data occur close together is referred to as exhibiting access locality. The primary instrument to achieve access locality, for the accesses occurring inside loop-nests, is loop transformation. Linear loop transformations such as interchange, rotation, reflection and skewing can be mathematically modeled and instrumented using unimodular matrices, as known by a person skilled in the art.

As the fixed cost related to initiation and execution of a transfer between foreground and background memory is rather high, the common practice is to amortize that fixed cost by transferring more than just one data item in a single transfer. For instance, to fetch a word from SDRAM to the L1-cache, the SDRAM row needs to be pre-charged which usually takes several processor cycles. However, once pre-charged, each element in the SDRAM row can be obtained in a single cycle with the burst mode. Therefore, transferring several data items together in a single transfer, using burst mode, can lead to performance improvement. This is true, provided, data items that are grouped to be transferred together are actually referenced in the same time period.

A code where unnecessary movement of data, due to transfers in groups, is minimized is termed by us as exhibiting layout locality. An equivalent way of expressing layout locality is—a code exhibits layout locality if it maximizes the opportunity offered by transfers in group, to organize code and data such that each transfer carries immediately useful data items. The second definition looks at layout locality as an opportunity that is to be maximized rather than a problem, according to the first definition, that needs to be somehow overcome.

To improve layout locality, there are two instruments available. Firstly, placement of data items could be organized in such a way that each transfer carries items that is certain to be referenced soon in the future. Secondly, the accesses could be reordered such that data items that are placed together are referenced together. The two instruments, naturally, can be employed together to decide placement and access order simultaneously.

Now, instead of decomposing the problem into access and layout locality optimizations, one could perhaps split it into loop transformation and placement decisions. In the loop transformation process the order in which the data would be referenced can be decided completely. In the placement process, the arrangement of data items in the memory can be decided. However, partitioning the problem into loop transformation and placement decisions leads to the following problem. Suppose that we perform loop transformation first. Since placement has not been done yet, the loop transformation can only optimize reuse. In the process, it fixes the access order completely—more than what is necessary to exploit the reuse. This completely fixing of the access order takes away many good placement solutions. Therefore performing loop transformation first leads easily to sub-optimal solution. Next, suppose the placement is done before any loop transformation. Since the access order will change later, during loop transformation process, placement process has no information based on which good layout decisions can be made. Therefore, placement before loop transformation also leads to poor locality solution.

Figure 5:
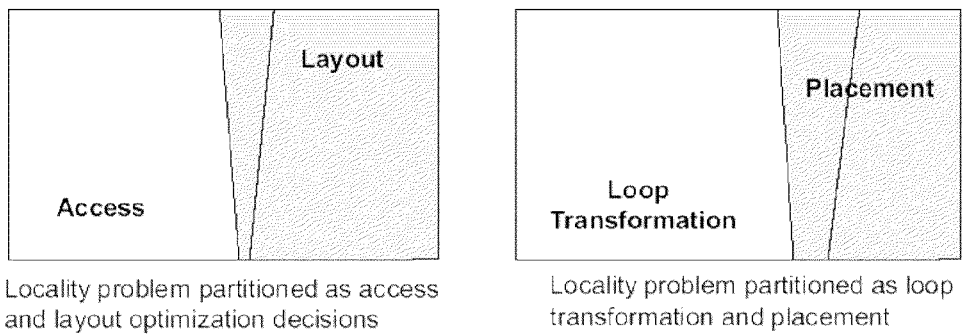
FIG. 5 illustrates that locality optimization can be partitioned (1) as access and layout optimization, as in accordance with embodiments of the present invention; or (2) as loop transformation and placement optimization as known from the prior art. The latter split has significant overlap in objectives, leading to sub-optimal solution. The second split has high overlap as loop transformation process constrains placement decisions completely. The first split is more effective at arriving at a good global solution as access locality optimization still leaves sufficient freedom for the subsequent layout optimization process.

Therefore, as shown also in FIG. 5, dividing the problem of locality optimization into loop transformation and placement decisions as known in the art leads to significant overlap in the objective space. Loop transformation fixes completely the access order, thereby making ineffective a lot of potentially good placement decisions. If placement is done first, it has no information on access order and so it cannot make meaningful decisions. On the other hand, the partition of locality into access and layout in accordance with embodiments of the present invention, allows access locality optimization to proceed without taking away all the good layout solutions because in improving access locality, the access order is not completely fixed.

In the literature, locality is usually split into temporal and spatial. By spatial, however, some authors as for example Randy Allen and Ken Kennedy, in "Optimizing Compilers for Modem Architectures", Morgan Kaufmann Publishers, 2001, imply simply placement of data, or data-layout. By temporal locality they mean loop transformation. This interpretation of temporal and spatial is then exactly the same as the above categorization, into loop transformation and placement. Therefore it suffers from the exactly same problem as identified above.

Locality optimization across multiple loop-nest can be a difficult problem. However, the problem can still be solved in an effective, scalable, way by ranking the loop-nests, based on constraints emanating from data-dependences and data reuse.

Suppose that we have n loop-nests in an application and the iteration-space of the $k^{th}$ loop-nest is denoted by $\vec{I}_k$. To avoid additional notation, $\vec{I}_k$ will be used to denote both the vector-space and a particular vector in that space. The distinction will be clear from the context. Let the set of arrays referenced in these n loop-nests be $A=\{A_1, A_2, \ldots, A_m\}$. A problem now is to find the loop and data placement transformations that result in the best combination of access and layout locality.

If a loop transformation, denoted by matrix $T_k$, is applied to loop nest $\vec{I}_k$, then a vector $\vec{I}_k$ is mapped to vector $\vec{I}'_k$, and the two are connected by the relation $\vec{I}'_k = T\vec{I}_k$. If array $A_p$, was accessed in $\vec{I}_k$ using the reference matrix $R_p$, and offset $\vec{o}_p$ then the new index expression in space $\vec{I}'_k$ will be $R_p T_k^{-1} \vec{I}'_k + \vec{o}_p$.

Suppose also that placement transformation matrix $M_p$, is applied to array $A_p$ to improve its layout locality in the loop nest $\vec{I}'_k$. In order to have layout locality, consecutive iterations of the innermost loop in $\vec{I}'_k$ access consecutive elements of $A_p$. Therefore, the following relationship is satisfied:

$$M_p = \left( R_p T_k^{-1} \left( \vec{I}'_k + \begin{bmatrix} 0 \\ \cdots \\ 0 \\ 1 \end{bmatrix} \right) + \vec{o}_p \right) - M_p \left( R_p T_k^{-1} (\vec{I}'_k) + \vec{o}_p \right) = \begin{bmatrix} 0 \\ \cdots \\ 0 \\ 1 \end{bmatrix}$$

The above equation basically formulates the layout locality constraint: in order to have good layout locality, if we move from iteration $\vec{I}'_k$ to the next iteration, i.e. only the last row of $\vec{I}'_k$ increases by 1, then the data-layout or placement matrix $M_p$ should be such that the displacement in the referencing of array $A_p$, is only in the last dimension and by 1 as well. The above layout locality constraint simplifies to:

$$M_p R_p T_k^{-1} \vec{U}_{dim(\vec{I}_k)} = \vec{U}_{dim(A_p)} \quad \text{(Eq. 1)}$$

where $dim(\vec{I}_k)$ is the number of dimensions in $\vec{I}_k$, and $dim(A_p)$ is the number of dimensions in array $A_p$. $\vec{U}_d$ is a d-dimensional column vector of which all elements are zero, except the last one which is a 1. For example, $\vec{U}_3 = [0\ 0\ 1]$.

Firstly, it is to be noted that, when improving layout locality for the loop-nests neither $T_k$ nor $M_p$ are known. In Eq. 1, observe that $T_k$ and $M_p$ appear jointly as product terms. Therefore, the problem at hand is at least as complex as integer quadratic constraint programming. However, since the matrices $T_k$ and $M_p$ needs to be unimodular, or at least invertible and integer-valued, the problem quickly becomes highly non-linear even for a single loop-nest.

Secondly, a particular choice of $T_k$ has an effect on the access pattern of array $A_p$, assuming array $A_p$ is accessed inside loop-nest $\vec{I}_k$. If the loop order is changed, then obviously the access pattern of the arrays accessed inside that loop-nest will change. In order to still have layout locality, the placements of the arrays may therefore be changed. That is, if $T_k$ is changed then $M_p$ may be changed. Moreover, since $A_p$ could have been accessed in some other loop-nest, say $\vec{I}_l$, the choice of $M_p$ may have an impact on $T_l$. For instance, if the access pattern of $A_p$, in loop-nest $\vec{I}_l$ does not match the way decided to do placement for $A_p$, reflected in the choice of $M_p$, then the access order of $\vec{I}_l$ may be changed by choosing an appropriate $T_l$.

Next, suppose another array $A_q$ is also accessed in both $\vec{I}_k$ and $\vec{I}_l$. $T_l$ may destroy the layout locality of $A_q$, in $\vec{I}_l$. That can be rectified by applying $M_q$ to $A_q$. Next, as $A_q$ is also accessed in $\vec{I}_k$, if the layout locality of $A_q$ (with $M_q$) in $\vec{I}_k$ is also poor then a transformation $T_k'$ needs to be applied (as placement of $A_q$ is now already fixed). But now there is a problem of going in circles. The access locality of $A_p$ in $\vec{T}_k$ may be destroyed by $T_k'$.

In conclusion: decisions about $M_p$, $M_q$, $T_k$ and $T_l$ may be taken together as they affect each other. However, as $M_p$ and $T_k$ appear as product terms in Eq. 1, the problem at hand is at least as complex as integer quadratic constraint programming which ILP (Integer Linear Programming) solvers cannot even handle. Since $T_k$ and $M_p$ need to be invertible and integer-valued, and access locality and data dependencies also need to be taken into consideration, the problem quickly becomes combinatorially explosive.

Locality optimization across multiple loop-nests is thus a complex, non-linear problem, for which a reasonable, near-optimal and scalable solution is provided in accordance with embodiments of the present invention.

In accordance with embodiments of the present invention, there is started with one loop-nest. First, (its access locality is improved by computing the reuse vectors and applying them to find an appropriate transformation matrix $T_t$. Having improved the access locality, an additional transformation $T_s$ may then be applied to improve the layout locality of the arrays accessed in that loop-nest, and whose data placement is already fixed. However, $T_s$ should not destroy the access locality. The complete transformation is $T=T_s*T_t$ and it must respect the data-dependences. Having fixed T, thereafter the placement M for the arrays accessed in the loop-nest is fixed, whose placement is not already fixed, with the objective of improving the layout locality. The placement information is then propagated to the next loop-nest where the above process is repeated. It is to be noted that by deciding on T first and then M's the quadratic integer problem is avoided.

In an optimization process according to embodiments of the present invention, what is essentially done is fixing the placement or data-layout of the arrays as the procedure goes along from one loop-nest to another. The reasoning is that the loop-nests down the chain could be transformed easily to align their access pattern to the prefixed placements so that good layout locality may still be achieved.

Access locality is more important than layout. Therefore, it may not be desired to transform a loop-nest down the chain to improve layout locality if the process access locality would be destroyed. Therefore, the presence of reuse imposes constraints on transformation to improve layout locality, much like data-dependences do.

Constraints in performing access and layout locality are data dependences and data-reuse.

With regard to data dependences, consider the two loop-nests in the code below:

for (i=0; i<3*N; i++)//Loop-Nest I
for (j=0; j<N; j++)
C[j][i]=B[i][j];
...
for (i=0; i<N; i++)//Loop-Nest II
for (j=0; j<N; j++)
A[i+1][j+1]=B[i+2*j][j]−A[i][j]−A[i][j+2];

Suppose Loop-Nest I is first optimized and then the placement information is propagated to Loop-Nest II. Since Loop-Nest I has no reuse, only layout locality can be optimized. If there is no reuse, no access locality has to be dealt with. For optimizing layout locality, data dependences are taken into account. For the array B to have good layout locality in Loop-Nest I, the placement of B may be set to be row-major. This decision about the placement is next propagated as a constraint to Loop-Nest II.

In Loop-Nest II, however, array B is accessed in a semi-diagonal manner. By applying a loop transformation to Loop-Nest II, it is possible to change the access order such that B gets accessed in row-major fashion. Thereby, B would have good layout locality in Loop-Nest II. For now, let us ignore the data dependences.

One such transformation that could be applied is $$T_1 = \begin{bmatrix} 1 & 2 \\ -1 & -1 \end{bmatrix}.$$

As seen before, the application of a transformation T results in the index expression changing from $R\vec{I}+\vec{o}$ to $RT^{-1}\vec{I}'+\vec{o}$, where R is the original reference matrix, $\vec{o}$ the offset, $\vec{I}$ the iteration vector in the original iteration space and $\vec{I}'$ the new iteration vector. Therefore, for array B the new index expression after the transformation would be $$RT_1^{-1}\vec{I}'+\vec{o} = \begin{bmatrix} 1 & 2 \\ 0 & 1 \end{bmatrix}\begin{bmatrix} -1 & -2 \\ 1 & 1 \end{bmatrix}\begin{bmatrix} i' \\ j' \end{bmatrix}+\begin{bmatrix} 0 \\ 0 \end{bmatrix} = \begin{bmatrix} i' \\ i'+j' \end{bmatrix}.$$

That is, the new reference is B[i'][i'+j']. As now consecutive iterations of the innermost loop access consecutive elements in the same row, good layout locality for B in Loop-Nest II has been successfully obtained.

Let us now see whether the transformation obeys the data dependences. Given a dependence vector $\vec{d}$, a transformation T is valid if and only if $T\vec{d}>\vec{0}$. Loop-Nest II has two data dependences. There is a dependence between the write A[i+1][j+1] and the read A[i][j]. Since the data written in iteration [i j] is read back in iteration [i+1 j+1], this dependence can be represented by the dependence vector $\vec{d}_1=[1\ 1]$. The second dependence is between the write A[i+1][j+1] and the read A[i][j+2] and can be represented by the dependence vector $\vec{d}_2=[1\ -1]$ since data written in iteration [i j] is read back in iteration [i+1 j−1].

Given a dependence $\vec{d}$, a transformation T is valid when $T\vec{d}>\vec{0}$. As $$T\vec{d}_2 = \begin{bmatrix} 1 & 2 \\ -1 & -1 \end{bmatrix}\begin{bmatrix} 1 \\ -1 \end{bmatrix} = \begin{bmatrix} -1 \\ 0 \end{bmatrix} < \vec{0},$$

the transformation T turns out to be invalid. So it can be seen that dependences can obstruct layout locality optimization.

Therefore, one should start with the loop nest that is constrained by data dependences and then the placements should be propagated to the ones that are not constrained. That is, in the sample code given above there should be started with Loop-Nest II. Since array B is accessed in a semi-diagonal fashion, the placement of B should also be semi-diagonal. An appropriate data-layout matrix for B in this case is $$M_B = \begin{bmatrix} 1 & -2 \\ 0 & 1 \end{bmatrix}.$$

It is to be noted that $$M_B R_B \vec{i} = \begin{bmatrix} 1 & -2 \\ 0 & 1 \end{bmatrix} \begin{bmatrix} 1 & 2 \\ 0 & 1 \end{bmatrix} \begin{bmatrix} i \\ j \end{bmatrix} = \begin{bmatrix} i \\ j \end{bmatrix}.$$

So the new index expression after layout transformation is B[i][j]. Therefore, the layout locality of B is improved after the layout transformation.

Next, $M_B$ needs to be propagated to Loop-Nest I, where B is originally accessed as B[i][j]. Applying the layout $M_B$ results in the index expression of B in Loop-Nest I becoming B[i −2*j][j]. Array B now has poor layout locality. However, because Loop-Nest I has no data-dependence, we can go ahead and apply an appropriate loop transformation so that the access changes to semi-diagonal as well. The appropriate transformation is $$T_I = \begin{bmatrix} 1 & -2 \\ 0 & 1 \end{bmatrix}.$$

The index expression for B after the transformation is:

$$M_B R_B T_I^{-1} \vec{i} = \begin{bmatrix} 1 & -2 \\ 0 & 1 \end{bmatrix} \begin{bmatrix} 1 & 0 \\ 0 & 1 \end{bmatrix} \begin{bmatrix} 1 & 2 \\ 0 & 1 \end{bmatrix} \begin{bmatrix} i \\ j \end{bmatrix} = \begin{bmatrix} i \\ j \end{bmatrix}.$$

Therefore, good layout locality is obtained for B in Loop-Nest I as well. The new code is shown below. There is an offset in the index expression of B, to shift the address space to positive indices.

```
for (i=-2*(N-1); i<3*N; i++)//Loop-Nest I
  for (j=max(0,-i/2); j<min(N-1, (3*N-1-i)/2)+1; j++)
    C [j][i+2*j]=B[i+2*N-2][j];
...
for (i=0; i<N; i++)//Loop-Nest II
  for (j=0; j<N; j++)
    A[i+1][j+1]=B[i+2*N-2][j]-A[i][j]-A[i][j+2];
```

The above learns that by choosing the right order in which to optimize the loop-nests, one is able to achieve good layout locality in both the loop-nests, in the above example. Given two loop-nests where there is data dependency present in one and not in the other, one may optimize first the loop-nest that contains the dependences. Given two loop-nests with equal or comparable number of memory accesses, one should optimize first the loop-nest that is more constrained by data dependences and then propagate the data-layouts from that loop-nest to the more flexible one. The lesser constrained loop nest has more freedom, and so it will be easier to find a legal loop transformation that matches the access order of the arrays to the predefined data placement. To measure the degree of constraint on a loop-nest, the maximum angle can be measured by which a loop nest can be skewed before one or more of the data-dependences become violated. This is because all loop transformations that are designed to improve layout locality involve only rotation and reflection. Reflection as such does not create or destroy spatial locality, hence the rotation angle is an accurate metric to measure constraints.

In addition to data-dependences, the presence of reuse in a loop-nest could restrict the freedom to transform it, additionally, to obtain good layout locality.

The following example code is considered.

```
for (i=0; i<N; i++)//Loop-Nest I
  for (j=0; j<N; j++)
    B[i][j]=A[i][j];
...
for (i=0; i<N; i++)//Loop-Nest II
  for (j=0; j<N; j++)
    D[i][j]=B[i][j]+C[j];
```

If Loop-Nest I is tackled first, then the placement of arrays A and B would be fixed to row-major to have good layout locality. But when there is moved to optimizing Loop-Nest II with these placements, a problem arises. In Loop-Nest II, there is reuse in reference of array C. This can be converted to access locality by performing a loop-interchange. However, this will change the access order of array B to column-major. This is bad for layout locality of B as its placement has already been set to row-major.

If instead there was started with Loop-Nest II, then a loop-interchange could be performed to improve access locality for C. This would mean that B's layout should be set to column-major for good layout locality in Loop-Nest II. Next, this placement is propagated to Loop-Nest I. As it is not constrained by reuse or data dependence a loop-interchange of Loop-Nest I can now be performed to improve layout locality of B here as well. The transformed code is shown below:

```
for (j=0; j<N; j++)//Loop-Nest I
  for (i=0; i<N; i++)
    B[i][j]=A[i][j]; //A:col-major, B:col-major
...
for (j=0; j<N; j++)//Loop-Nest II
  for (i=0; i<N; i++)
    D[i][j]=B[i][j]+C[j];
//B:col-major,D:col-major
```

Therefore, given two loop nests where there is reuse in one and not in the other, one should optimize first the loop nest with the reuse, as illustrated in the above example. For now, it is assumed that the data-dependence is either not present, or present to the same level in both the loop nests. It is to be noted that reuse is not exactly a constraint but an opportunity that one would definitely like to exploit (objective function). However, access locality exploitation is more useful than layout locality. A loop-nest that has reuse would, in accordance with embodiments of the present invention, first get optimized for access locality. The access order of that loop-nest is therefore quite dictated by the reuse pattern present in it. Therefore, from the perspective of layout locality optimization, reuse is indeed like a constraint.

It is rather easy to rank two loop-nests where there is reuse present in one and not in the other. Given two loop-nests with equal or comparable number of memory accesses, one should optimize first the loop-nest with few, or just one, equivalent reuse option, and then propagate the data-layouts from that loop-nest to the one with many, or no, equivalent reuse options.

For instance in the example above, Loop-Nest II has only one reuse possibility: the reference C[j]. Since there is only one reuse possibility and good access locality is desired, alternate access patterns, made possible through loop transformations, are not feasible. This means that there is not much freedom for additional layout locality optimization, through loop transformation, for arrays B and D. Loop-Nest I on the other hand has full freedom for layout locality optimization as it has no reuse.

Having no reuse at all is an extreme case, but freedom increases with increasing reuse options.

The general technique for computing the reuse options in a loop-nest would start with computing the reuse vectors for each reference. Then it would find the composite reuse vectors that would provide the maximum benefit when converted to locality. The flexibility of a loop-nest is then just a measure of how many different reuse vectors exist, all of which provide the same benefit.

The availability of multiple reuse options could come from separate references as discussed above. It could also come from just one single reference.

for (i=0; i<N; i++)
for (j=0; j<N; j++)
for (k=0; k<N; k++)
A[i][j+k][k]=B[i]+C[j][k][i];

In the example code above, there is just one reference B that has reuse. That reuse in B translates to perfect access locality as long as loop i is the outermost loop. However, it is to be noted that the loops j and k can be transformed in whatever way between themselves without reducing any access locality. Therefore, even a single reference could provide multiple reuse options.

The source of the multiple reuse options in the above example is, of course, in the nature of the reuse subspace. The reuse subspace of reference B spans two dimensions in a three-dimensional iteration-space. Any transformation that lets the innermost loop cut just one reuse subspace, i.e. not cutting several reuse subspace, will provide good access locality, while still at the same time providing enough flexibility for layout locality optimizing transformation on top of the access locality.

The invention will now be described by a detailed description of several embodiments. It is clear that other embodiments of the invention can be configured according to the knowledge of persons skilled in the art without departing from the technical teaching of the invention, the invention being limited only by the terms of the appended claims.

Embodiments of the invention relate to a method for pre-compiling or compiling code so as to be suitable for execution on a computation engine with a predefined architecture. Embodiments of the present invention in particular describe the ordering of the different processes or sub processes (phases) of computer code.

Embodiments of the present invention relate to methods for automated conversion of application code into optimized application code or into execution code suitable for execution on a computation engine with an architecture comprising at least a first and a second level of data memory units. The invention may especially be targeting computation engines with VLIW architectures and architectures as described in US-2006/212685 and/or WO 2007/065627, both of which are incorporated herein by reference, to exploit line level access and layout locality.

A method for conversion of application code into optimized application code or into execution code according to embodiments of the present invention comprises obtaining the application code, which includes data transfer operations between the levels of the memory units. At least part of the obtained application code is converted such that the data transfer operations between the memory units, and the data layout within the memory units are modified with respect to the corresponding data transfer operations and data layout of the non-converted code. The conversion process comprises dealing with access locality before dealing with layout locality, whereby, when dealing with access locality, decisions on the internal organization of at least some of the data transferred are not taken yet. Hence the scheduling of data transfer operations between the memory units is only partially fixed, while also partially, but not fully, fixing the placement of data transferred within the memory units. This partial fixing within the memory units of the placement of data transferred provides some freedom to the process of layout locality.

In embodiments of the invention a method is provided wherein processes improving access locality are performed and processes of improving the layout locality. It is characteristic for such embodiments that the access locality improvement processes are performed before the layout locality improvement processes.

Figure 2:
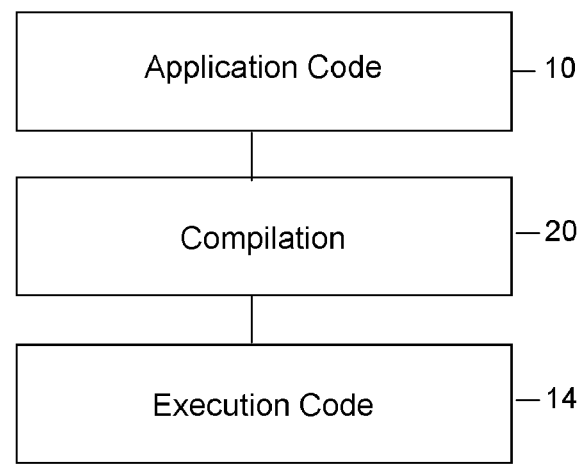
FIG. 2 is block schematic diagram representing a conversion from application code to execution code, where a method according to embodiments of the invention may be implemented in a compiler.

Embodiments of the invention can thus be seen as a pre-compilation process 11 applicable on application code 10, as illustrated in FIG. 1, whereby the outcome of the method is optimized application code 12 which is further used as input for one or more compilers 13 so as to generate execution code 14. Alternatively, as illustrated in FIG. 2, the method can be fully integrated within a compiler 20 generating from the application code 10 executable code 14 for a predefined architecture. Moreover in case the architecture of the computation engine allows for multiple instruction controllers for different parts of the architecture (multi-threading), the method may provide for a plurality of executable codes.

It is a characteristic of certain embodiments of the invention to provide a one-pass approach, meaning that no iterations between the various sub-processes of access and layout locality are provided. Nevertheless the different sub-processes are considered to be sufficiently orthogonal, meaning that although a previous process does limit the further change possibilities of further processes, that still global optimality is at least in principle achievable.

In embodiments of the invention a method is provided wherein a process of parallelization improvement is performed. This means that parallelization of data transfers between the different levels of memory units is performed. It is characteristic for such embodiments that this parallelization improvement process is executed before the locality (both access and layout locality) are executed.

A conversion method according to embodiments of the present invention is within the context of parallel data transfer and storage exploration and hence focuses on those parts of the application code with data parallel loops. A conversion method according to embodiments of the present invention will focus both on data-level aspects of different levels of memory units, such as back-ground memories, foreground memories, registers, and on functional units.

Figure 3:
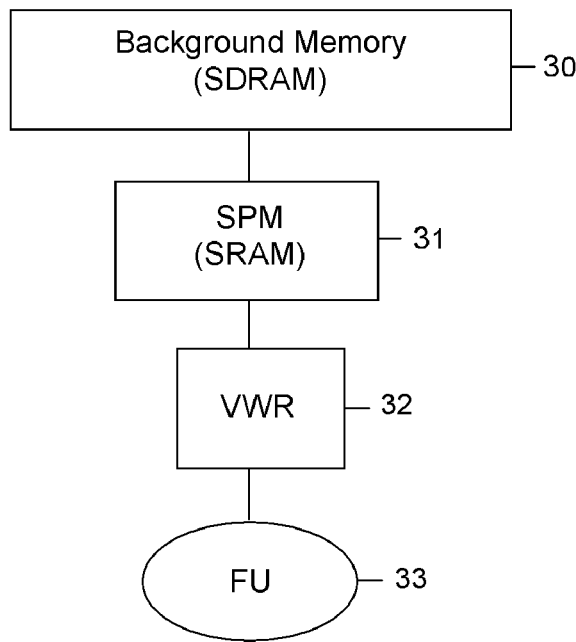
FIG. 3 illustrates different levels of memory units where a method according to embodiments of the present invention may be implemented.

A conversion method according to embodiments of the present invention is targeted for a computation engine with a pre-defined architecture. The pre-defined architecture comprises at least a first and a second level of memory units. In embodiments of the present invention, as illustrated in FIG. 3, the pre-defined architecture may comprise a first level of memory units being a background memory 30 with slow access (about 10.000.000 clock cycles), a second level of memory units being scratch pad memory 31 (RAM) with fast access (about 100 clock cycles), a third level of memory units being a data register 32 (or VWR) for immediate access (about 1 clock cycle), and a functional unit 33 (or data path). The access times given hereinabove are only approximations of typical values. Actual values of memory access times may vary, depending on the implementation of the respective memory levels. Also the numbers of levels in a memory hierarchy may vary, and the example given hereinabove is only one of a plurality of possibilities. In alternative embodiments, also a further level of memory units being level 1 cache (L1) with very fast access (about 3 clock cycles), and yet another level of memory units being level 2 cache (L2) with fast access (about 10 clock cycles) may be provided.

A conversion method according to embodiments of the present invention handles data transfer instructions and handles data at various levels of granularity, i.e. between various levels of memory units. One may distinguish the following terms with regard to granularity: arrays, basic groups, lines, words and sub words.

A basic-group (BG) is a set of data items that are accessed in the same way and therefore form a cohesive entity for transfer to and from a level of memory units, e.g. the SPM. Items in a basic group typically have strong interactions between them (i.e. there are strong consumer producer links between them). A basic group is an alternate view to arrays and therefore a BG can be parts of different arrays clubbed together or a part of one array that is differently accessed. A line is a data set that fits in a row of a monolithic partition of a level of memory units, e.g. the SPM. A line consists of words. A word is a data set that can be read out from or written to 1 port of the VWR to/from the data path. A word consists of 1 or more sub-words. Sub-words are data elements within a word that can operate in parallel in the data path (in a SIMD manner).

A conversion method according to embodiments of the present invention is structured in various sub processes. Some of these focus on layout locality (defined for a particular data element on a level of memory units, e.g. a component like SPM, VWR, main memory e.g. SDRAM or L2 level memory), others on access locality (defined in terms of an interface between two components), each of these terms being applicable to a different granularity of data as shown below:

Inter-Line Level Layout Locality=lines that are accessed closely together in time are brought together in space Line Level Layout Locality=words from a line that are accessed closely together in time, are brought together closer in the line in space Word Level Layout Locality=sub-words from words that are accessed closely together in time are brought together closer in the word in space Basic Group Access Locality (for example for the SDRAM-SPM interface)=Basic groups that are reused are brought together in time; e.g. communication between the SDRAM and the SPM is reused.

Line Access Locality (for the SPM-VWR interface)=lines that are reused are brought together in time; e.g. communication between of the SPM and VWR is reused.

Conversion methods according to embodiments of the present invention at different granularities are looked at in more detail herein below.
Line Level
Line level Parallelism In a first process, which is optional according to embodiments of the present invention, line level parallelism may be improved.

There exists line level parallelism between two basic groups if they can be operated in parallel. Line level parallelism is a form of coarse grained (multi-processor) parallelism unlike the fine grained parallelism of SIMD (data-level) and ILP (instruction-level). One way to exploit line level parallelism is by having two or more SPMs operating in parallel. Another way that line level parallelism information could be useful is that inter-line level access locality needs this line-level parallelism information to make better decisions. For example, if two basic groups can be operated in parallel, it means that data-dependence between them is absent.

The decision regarding which basic groups could be operated in parallel is made in this process. Two groups can operate in parallel if no immediate data-dependence exists between them.

A pre-compiler or a compiler will need to search across loop-nests to find line level parallelism. In embodiments of the present invention this can be done by taking into account data dependencies. In embodiments of the present invention, a polyhedral model may be used to find a good solution. It is assumed that the program has been well (function) in-lined to provide a wider scope. In this case, the analysis may look at a larger part of the program, for example across multiple loops.

The information needed to provide quality line-level parallelism is: (a) the degree of parallelism to be provided; (b) the size of each parallel code that needs to be executed; (c) the degree of fine grained parallelism remaining in each line-level parallel code and (d) from the code-access pattern and data dependence.

Cost factor to be taken into consideration when considering line level parallelization is size of each parallel code, since each parallel code should have sufficient computation in it. This is very similar to any coarse-grained parallel system. The larger the size (in data but more importantly in computation) of each code the lesser the synchronization overhead.

Once the computation has been broken into line-level parallel codes i.e. once an optional parallelization improvement process has been performed, inter-line access and layout locality can be performed individually on the parallelized chunks.

This parallelization process provides a set of basic groups assigned to each SPM.
Inter-Line Access Locality In this process a decision is taken on the composition of the second level of memory units, e.g. SPM—that is, which basic groups reside on it at different time instants. Hence, this process schedules data transfer operations from a first level of memory units to a second level of memory units, e.g. from background memory to SPM. The original program may or may not have high access locality (i.e. basic groups that are reused quickly once they are produced). The purpose of converting the code to improve inter-line access locality is to bring reuse of basic groups closer together in time than would be the case in the original code. The internal organization of the basic groups within the second level of memory units is therefore not yet decided, at least not completely. Any freedom that can still be provided to subsequent processes (layout locality) will be provided.

From the coarse-grain composition provided by the line-level parallelism process, composition across shorter time spans regarding which basic groups reside on SPM need to be found. This may be done by using a polyhedral model and analyzing the access pattern of the different arrays. The search is therefore across basic groups (defined earlier as parts of a single or multiple array elements that are accessed in a similar way) and the accompanying computation.

Knowledge about the access pattern of the elements in the basic groups is required to improve access locality.

The main objective of this process is to minimize multiple transfers of the same basic group from a first level of memory units to a second level of memory units, e.g. from SDRAM to SPM or vice versa.

The Inter-line access locality optimization process according to embodiments of the present invention only partially fixes the access order, so that accesses of data accessed multiple times are brought closer together in time than would be the case in the original, non-converted code. However, the placement of the basic group is not fixed at all, or is at least not completely fixed. This is done in the next process of layout locality.

Inter-Line Layout Locality

This process determines the content and placement of basic groups on the second level of memory units, e.g. the SPM. The basic groups in SPM may be placed such that layout locality is improved, i.e. such that data which is accessed closer together in time is also brought closer together in the layout than would be the case in the original, non-converted application code. This may be done in a way which is similar to the previous set of access and layout locality optimization processes. Instead of working at arrays this works in basic groups.

The content and placement is only at the basic group level. Inside the basic group, the content and placement of each line is not decided in this process. This is performed at another level of granularity.

For each basic group, one may search across all loop-nests where that basic group is used, to determine the best layout. A method to do this may be similar to the layout optimization techniques used in arrays.

The size, composition and access order of the basic groups need to be known. Additionally, access matrix for the arrays or basic groups referenced, loop structure and loop bounds need to be known.

The intention is to reduce shuffling effort so that basic groups fit nicely on the SPM at any time.

Once the position of basic groups is determined, the access and layout decision of each constituent line of the basic groups can be done, if there are more than two levels of memory units. In the embodiment illustrated and described, the process subsequent to the inter-line process (access locality+layout locality) is the line level process, which is to be performed with respect to the third level of memory units, e.g. the VWR. The VWR process will be provided with flexibility to organize data and operations within the lines.

The information that the present process—inter-line layout locality—provides to the line-level process is: (a) the (freedom) information—what is fixed and what decisions are still to be made; (b) organization of basic groups on the second level of memory units, e.g. SPM and (c) the items in the basic group.

Word Level

Word Level Parallelization

This process decides on which words are to be used (read) in parallel either across two third-level memory units, e.g. VWRs (assuming a dual issue architecture) or reading from two ports of the third level memory units, e.g. VWR, in parallel assuming two words read can be operated on simultaneously. The word level parallelization decision is optional.

The complete application code of the program or function would be in the search scope of this process. The information needed for this process is the control data flow graph (CDFG) of the program, a graph to schedule memory accesses and operations for hardware design, as well as the polyhedral model (PDG) of the array accesses. The first thing to do is an analysis of the CDFG and the polyhedral model to analyze which parts of the execution can potentially be done in parallel. Given the CDFG, the dependencies between operations are known. Once two operations are found that do not have dependencies, they can potentially be executed in parallel. The transformations done in this process would combine the words (in different or same arrays or basic groups) that can be done in parallel.

This process potentially influences the instruction memory hierarchy the most as the instructions required for the two parallel operations can be coupled together. This would mean that the bits required for indication which operation to perform need not be duplicated. The register file inputs would need to be different though. Hence some compression on the bits required to be read out from the instruction memory can be reduced.

The analysis of which words could be used (read) in parallel may optionally be done here and the scope of this search is global and hence this is a reason why the word level parallelization process precedes line level locality processes. This part of analysis of what arrays could be used in parallel and what need to be accessed together is done here. This analysis information is a crucial part of the Word level parallelization process. This information is passed on to the future processes (especially the line level locality) process for performing the decisions there.

This word level parallelization process precedes the line level access and layout locality processes. The optional word level parallelization process precedes the line level processes because it has a wider search scope than that of the line level processes. The word-level parallelization process looks across dependence chains because it needs to find data parallelism across loops else no gains would be obtained globally. The word level parallelization process looks across dependence chains and already ensures that there is consistency in the access patterns and hence, this need not be explored again by the line-level processes. Hence, the more global process may precede the more local processes. The gains of the line-level locality processes would not be reduced by making it local because of the fact that the global analysis required for the process has already been performed in the word level parallelization process which precedes it.

Line Level Processes Access Locality

The Line Level Access Locality process precedes the Line Level Layout Locality process.

The line-level access locality process decides what the order is in which words will be accessed from a given line and the corresponding local transformations/optimizations associated with this. This may be done by 'partially' inserting/fixing a data transfer operation of a certain set of data from the second level of memory units to the third level of memory units. This process may improve the access locality for the read and write accesses between the second and third levels of memory units, e.g. the SPM and the VWR components, thereby reducing the cost, in terms of energy consumption. This again is in accordance with embodiments of the present invention, where scheduling of data transfer operation precedes deciding on layout, the data transfers being partially fixed.

The decisions in this process can be further broken down into the following decisions:

1. Schedule read decision from second level of memory units toward third level of memory units, e.g. from SPM toward VWR
2. Schedule write decision from third level of memory units to second level of memory units, e.g. from VWR toward SPM
3. Schedule read decision from third level of memory units towards second level of memory units, e.g. from VWR toward SPM
4. Schedule write decision from second level of memory units towards third level of memory units, e.g. from SPM toward VWR The line-level access locality processes decide on the schedule for the accesses of the above four decisions.

The search scope relevant for this process would be in worst case the complete program, i.e. the complete application code. To decide the line-level access locality of the SPM and the VWR, it is needed to know the production and consumptions of the different arrays over the program. To decide (DS) for a given array A, the Information (IN) needed would be the production and consumptions of every single element of array A along with the production/consumption of the arrays that are accessed with A.

Two information scopes are possible:
1. One dependence deep
2. Multiple dependence deep: Another possibility is to increase the information used to make the same decision by looking at multiple levels of production/consumption of the arrays that are accessed together (read/write).

Since this process of line level access locality decides the line-level access locality of the second and third levels of memory units, e.g. the SPM and the VWR, it definitely needs to take into account the cost of these levels of memory units, e.g. the SPM and the VWR. As it feeds into the memory management unit (MMU) and the datapath (DP), high-level estimates of cost of these components are also needed.

The line level locality processes succeed the word level parallelization process. The line-level access locality precedes line level layout locality. The line level processes follow the inter-line access and layout locality. The line level locality also follows the global word-level transformations.

The inputs to the Line level access locality process come from the global word level transformation process. The inputs include transformations that have improved parallelization possibilities for the sub word parallelization/SIMD parallelization process. Decisions have been made by the earlier processes (Inter-line access locality process) on coarser (larger data chunks) access patterns. This process decides further on the access order of a smaller granularity of data chunks (lines). This is passed as constraints to the following process. In a pathological case, this could also mean completely fix the access order for each word. This would completely remove freedom for the following processes. In a typical case according to embodiments of the present invention freedom is given from the inter-line and word level parallel processes to the line level process and a similar sort of freedom is passed on to the following processes, if applicable.

Line Level Layout Locality

Since in an architecture for use with embodiments of the present invention data layout is extremely important (due to limited flexibility of the VWR of where data goes), data layout in the VWR and SPM are extremely important.

The line-level layout locality process decides on the layout organization of data present in the different components constituting the second and third levels of memory elements, e.g. SPM and VWR. Given the freedom from the previous access locality process, the layout locality process partially fixes the layout of words inside lines. This layout allocation, in embodiments of the present invention, depends on the register allocation, which therefore needs to be decided together. Improving the line-level layout locality of these components reduces the access cost as the addressing is simplified and at the same time the number of accesses is reduced.

The decisions in this process can be further broken down into the following decisions:
1. Data layout (of words) inside a line of the second level of memory units, e.g. SPM
2. Data layout (of words) inside the third level of memory units, e.g. VWR Once again these layouts may be different as it is possible that the interface changes the layout when read out from the second level of memory units, e.g. SPM, to the third level of memory units, e.g. VWR. Alternatively, the layout can be the same due to cost reasons, e.g. if the shuffle network required for generically shuffling all the words of the second level of memory units, e.g. SPM, to the third level of memory units, e.g. VWR, is too expensive, e.g. because a large full cross-bar is needed.

A case where decisions 1 and 2 are made is for example: the inter-line process has fixed that array elements A[0-15] go to logical line L1 of the second level of memory units, e.g. SPM, and elements A[16-31] go to line L2. This would mean that the contents of lines L1 and L2 have been completely fixed and the placement of the words inside the line is still not fixed, and the freedom is still available.

Such a placement freedom is exploitable when performing in-place mapping at the line level, i.e. a single location where multiple data is placed. It is to be noted that the content and placement decisions are not orthogonal to each other and may be solved together. This is assuming that in-place mapping is done. If in-place mapping is prohibited content and placement would be orthogonal where content could precede placement.

In case of in-place mapping, the decision on in-placing would be done across both line-level access and layout decision processes, as the notion of in-place is not orthogonal on its own. Also it is desired that the layout (content or placement) decisions which do not gain much on the line-level process should not be made and the freedom should be left for the processes further on. This corresponds to the partly fixing in the access process. Similarly, the layout process can also only partly fix, and leave some freedom for the next process which follows. An example of a flow could thus be:

access inter-line: partly fix; leave some freedom for layout
layout inter)line: partly fix; leave some freedom for next process
access line: partly fix; leave some freedom for layout
layout line: partly fix; leave some freedom for a next process or completely fix if no next process available The search scope relevant for this process would be worst case the complete program. To decide the line-level layout locality of the second and third levels of memory units, e.g. the SPM and the VWR, it is needed to know the production and consumptions of the different arrays over the program. To decide (DS) for a given array A, the Information (IN) needed would be the production and consumptions of every single element of array A along with the production/consumption of the arrays that are accessed with A.

Two possible information scopes are needed:
1. One dependence deep:
2. Multiple dependence deep:

Since this process decides the line-level layout locality of the second and third levels of memory units, e.g. SPM and VWR, it definitely needs to take into account the cost of the SPM and the VWR. As it feeds into the MMU and the DP, high-level estimates of these components are also needed. The cost consists of two parts: (1) the components that are directly affected/decisions are made and (2) the components that are constrained due to the decision made.

In embodiments of the present invention, the costs are high-level estimates as these processes have not been finalized. For optimizing the line-level locality, it is desired to have an estimate of the following processes so that the optimality of the following processes is not jeopardized. A person skilled in the art can think of various ways to do this. For example the number of independent instructions in one way of finding what the ILP available is.

As explained in the previous process, this process follows the access locality. This process precedes the sub-word parallelization/SIMD parallelization process.

From the previous processes (inter-line access and layout locality) the content of a line has been partially decided and the placement in the lines has been partially decided (fully decided in a pathological case). This is taken as input for the line level layout process. On top of this the access order would also have been partially decided by the inter-line and line level access locality processes. Or stated differently: the line level layout process gets constrained by the two inter-line processes as well as by the line-level access process. With these inputs the line level layout process would pass on constraints on position of words inside a line to the following processes, such as e.g. sub-word parallelization/SIMD or the remaining compiler processes in case the proposed technique is used as a pre-compiler. Once again as a pathological case it is possible that the exact position of each of the words inside a line would have been decided completely, else (for normal cases) constraint on the word position is passed on to the following processes. This freedom can potentially be exploited by the following processes.

This process improves the layout locality on a smaller part of a second level of memory units, e.g. SPM, in particular the line. Since a target architecture for use with embodiments of the present invention has lines (which are transferred between lines of the second level of memory units, e.g. SPM lines, and the third level of memory units, e.g. VWR) and hence the opportunity to improve the layout locality in these lines, by nature of the proposed architecture, this problem needs to be addressed. In normal register files there is no concept of data layout, but in case of a VWR there exists such a problem which needs to be explored/exploited. Since the VWR removes the flexibility of putting any data from the SPM to the VWR, data layout in the VWR is important and hence a characteristic process of the proposed compiler according to embodiments of the present invention.

In the above embodiments of the present invention, the access locality process may provide a plurality of schedules, while the layout locality process then may select one of the schedules. This selection of one of the schedules may be performed based on a cost function.

Figure 6:
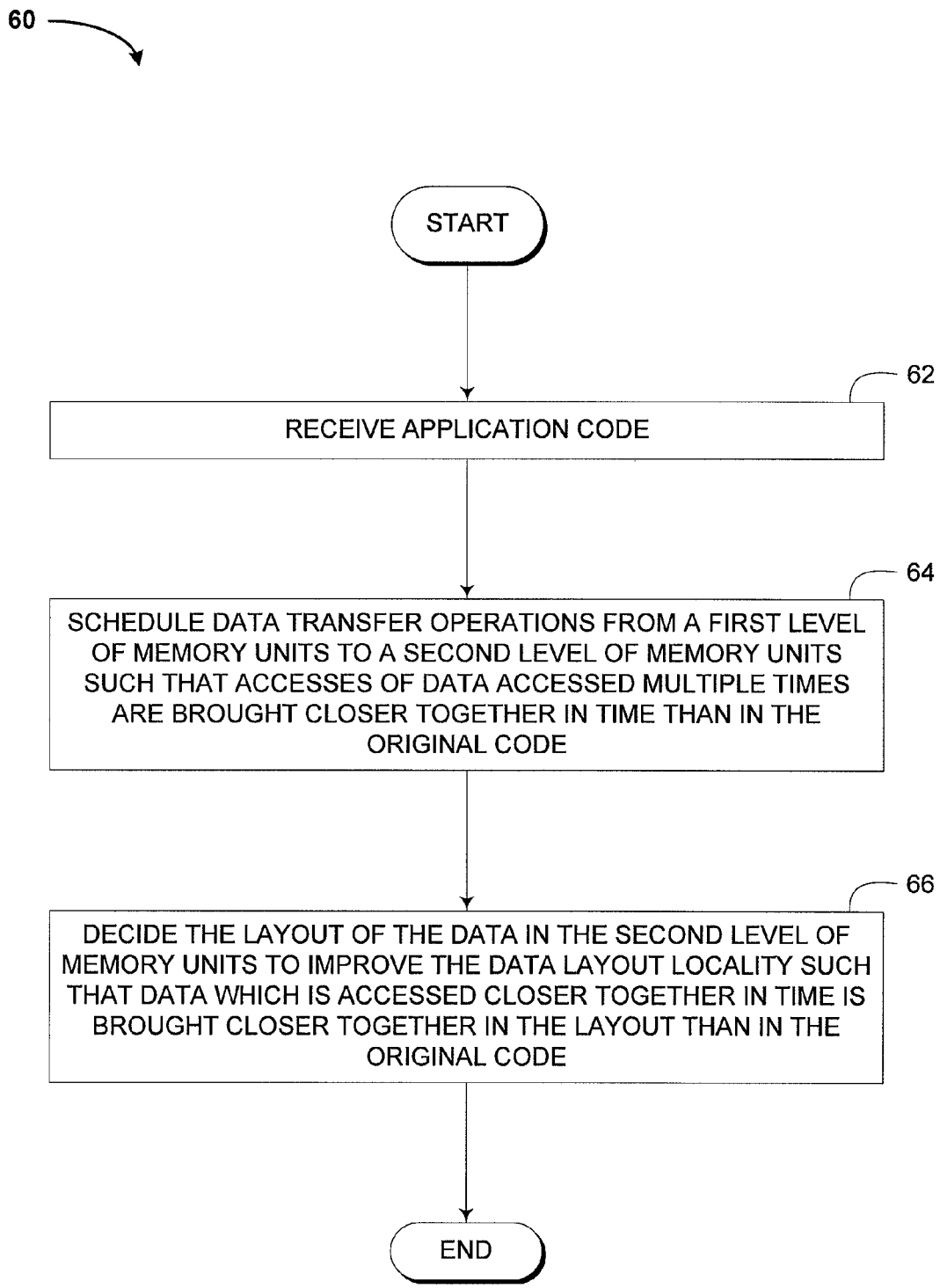
FIG. 6 shows a flowchart of one embodiment of a method of converting application code into optimized application code or into execution code suitable for execution on a computation engine with an architecture comprising at least a first and a second level of memory units.

FIG. 6 shows a flowchart of one embodiment of a method of converting application code into optimized application code or into execution code suitable for execution on a computation engine with an architecture comprising at least a first and a second level of memory units. The method 60 starts at a block 62, wherein application code is received, the application code comprising data transfer operations between the levels of memory units. Next, at least a part of the application code is converted. The converting of the application code comprises, for example, blocks 64 and 66. At block 64, data transfer operations from a first level of memory units to a second level of memory units is scheduled such that accesses of data accessed multiple times are brought closer together in time than in the original code. Moving to block 66, layout of the data in the second level of memory units is decided to improve the data layout locality such that data which is accessed closer together in time is also brought closer together in the layout than in the original code. In one embodiment, the layout of the data is decided after the scheduling of the data transfer operations.

In one embodiment, the scheduling of data transfer operations does not decide on the internal organization of at least some of the data transferred, hence fixing the scheduling of data transfer operations only partially while also partially fixing the placement of all the data transferred, thereby providing freedom to the deciding of data layout.

Figure 7:
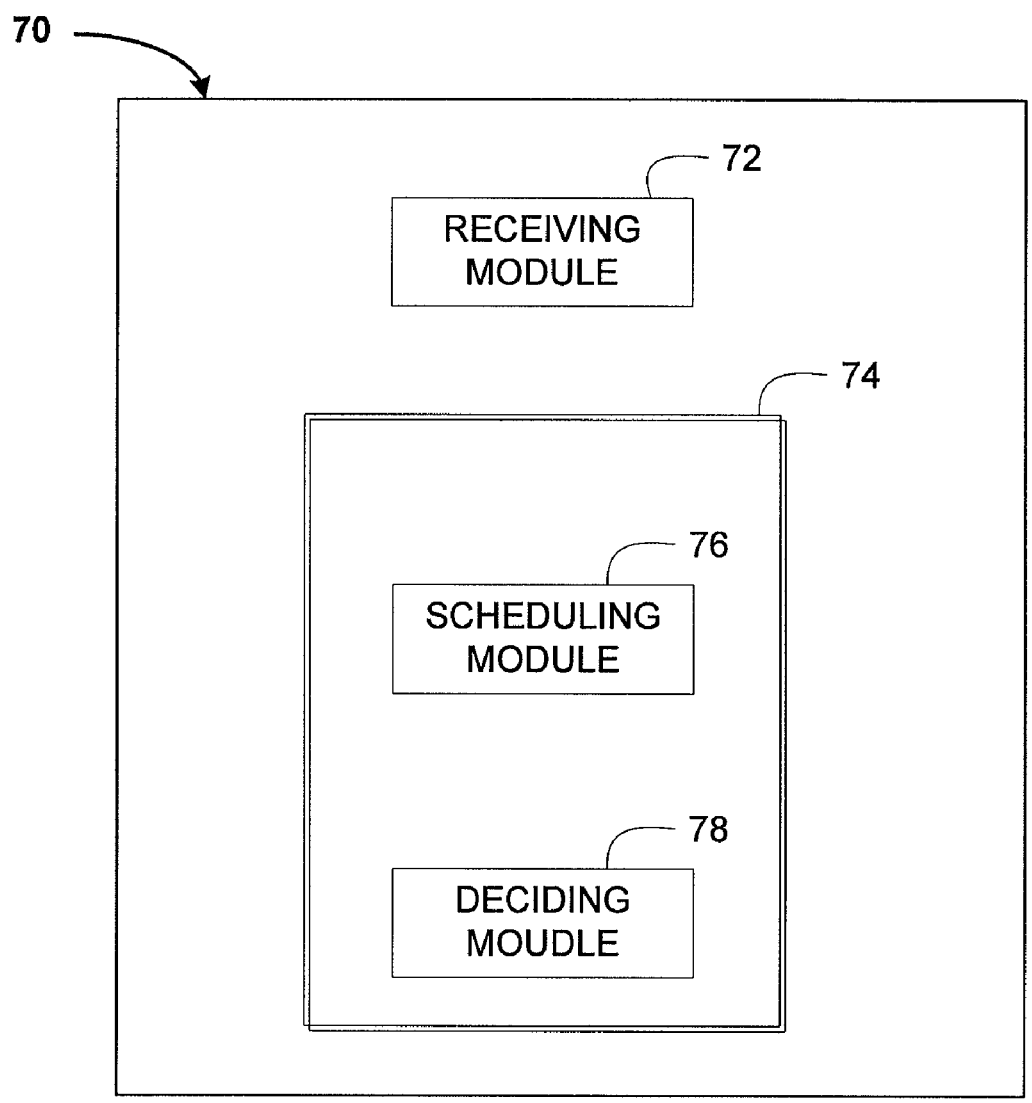
FIG. 7 shows a block diagram illustrating one embodiment of a system configured to convert application code into optimized application code or into execution code suitable for execution on a computation engine with an architecture comprising at least a first and a second level of memory units.

FIG. 7 shows a block diagram illustrating one embodiment of a system configured to convert application code into optimized application code or into execution code suitable for execution on a computation engine with an architecture comprising at least a first and a second level of memory units. Depending on the application, the system 70 may be a pre-compiler configured to convert application code into optimized application code for execution on a computation engine with an architecture comprising at least a first and a second level of memory units, or a compiler configured to convert application code into execution code for execution on a computation engine with an architecture comprising at least a first and a second level of memory units.

The system 70 comprises a receiving module 72 configured to receive application code, the application code comprising data transfer operations between the levels of memory units. The system 70 further comprises a converting module 74 configured to convert at least part of the application code.

The converting module 74 may comprise a scheduling module 76 configured to schedule data transfer operations from a first level of memory units to a second level of memory units such that accesses of data accessed multiple times are brought closer together in time than in the original code. The converting module 74 may comprise a deciding module 78 configured to decide layout of the data in the second level of memory units such that accesses of data which is accessed closer together in time are also brought closer together in the layout than in the original code.

In one embodiment, the deciding of layout is performed after the scheduling of data transfer operations. In one embodiment, the scheduling module 76 does not decide on the internal organization of at least some of the data transferred, hence fixing the scheduling of data transfer operations only partially while also partially fixing the placement of all the data transferred, thereby providing freedom to the deciding module 78.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

EXAMPLES

Figure 4:
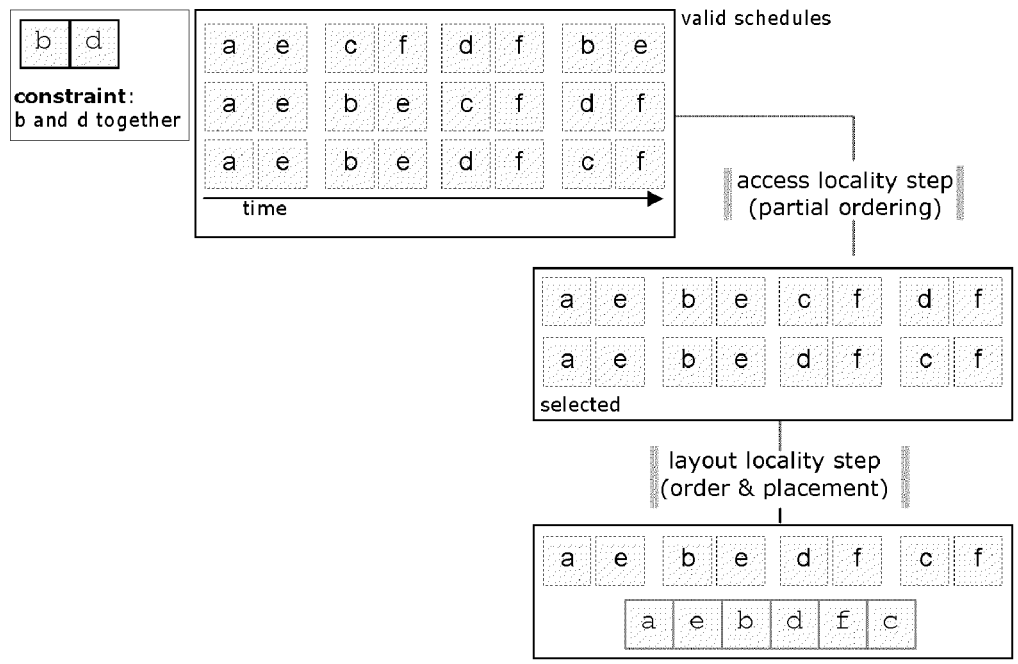
FIG. 4 illustrates an example of performing access locality before performing layout locality in accordance with embodiments of the present invention.

An example of access and layout locality performed in accordance with embodiments of the present invention is illustrated in FIG. 4.

As a first example, access and layout locality are dealt with at SPM level. In the example illustrated, there are six basic groups: a, b, c, d, e and f. Each basic group comprises arrays or parts of arrays which have a similar access pattern and are used together. As an example there is an initial constraint in the code that basic groups b and d should be next to each other.

In the embodiment illustrated all these basic groups are present in the first level of memory units, in this case the background memory or SDRAM, and they need to be brought to the second level of memory units, in this case the SPM or SRAM. This can be done in different ways. Valid schedules are shown at the top part of FIG. 4.

The inter-line access process performs the scheduling of the transfers of at least one of these basic groups from the first level of memory units, e.g. SDRAM, to the second level of memory units, e.g. SRAM. The objective of this process is to reduce the number of transfers between the first level of memory units, e.g. SDRAM, and the second level of memory units, e.g. SRAM. This implies that for the reduced number of transfers, the ACCESS process would fix the transfers of the basic groups in any of the following orders, as illustrated in the middle part of FIG. 4:

a,e,b,e,c,f,d,f or
a,e,b,e,d,f,c,f.

Since both of these order of access has the same number of effective transfers, the access process only partially constraints the order of access. The scheduling of the data transfer operations thus only partially decides on the internal organization of the data transferred. It does not decide on the internal organization of at least some of the data transferred, hence fixing the scheduling of data transfer operations only partially while also partially fixing the placement of all the data transferred, thereby providing freedom to the subsequent process of inter-line layout locality.

The inter-line layout process then performs the precise layout of the basic groups in the second level of memory units, e.g. SRAM, by modifying the index expressions of the different arrays in the basic group and their corresponding access functions. Since only a partial schedule is fixed by the preceding access process, the layout process has a substantial freedom to find a layout solution such that basic groups that are accessed together are physically located near to each other (improved locality). This process would then also fix the final schedule, for example, as illustrates at the bottom of FIG. 4:

a,e,b,e,d,f,c,f with the appropriate optimal layout of these basic groups in the second level of memory units, e.g. SRAM, for example:

a|e|b|d|f|c

This would ensure that both the number of transfers between the first level of memory units, e.g. SDRAM, and the second level of memory units, e.g. SRAM, is kept to a minimum and also the spatial locality of the different elements is optimized (which implies that basic groups which are accessed together are physically located near each other).

As a second example, access and layout locality are dealt with at VWR level. In embodiments of the present invention, these access and layout locality processes at VWR level can be dealt with after the access and layout locality processes at SPM level has been dealt with.

Consider an architecture with three very wide registers (VWRs), VWR1, VWR2, VWR3, where each VWR in turn can store 4 words. Consider the code below, having three loops, which is to be mapped on the VWRs:

```
L1: for(i=0;i<8;i++) {
    a[i] = b[i] + c[i];
}
L2: for(i=0;i<8;i++) {
    T = b[i] + a[i];
    d[i] = T + e[i];
}
L3: for(i=0;i<8;i++) {
    g[i] = f[i];
}
```

In the line-level access process, a conflict graph may be used of different arrays used in different loops. A conflict graph representation is used for the different arrays. Then the arrays in each loop are allocated to a VWR and the number of words in a VWR.

In view of the conflict graph representation, the 3 arrays have to be allocated to different VWRs, eg. VWR1, VWR2, VWR3. In case there is no conflict, this freedom is passed on to the following (layout) process.

Loop L1: a is allocated to VWRx and 2 words, b is allocated to VWRy and 2 words, c is allocated to VWRz and 2 words; $x \neq y \neq z$.

Loop L2: a is allocated VWRp and 2 words, b is allocated VWRq and 2 words, d is allocated VWRr and 2 words, e is allocated VWRt and 2 words; $p \neq q$ and $r \neq t$.

Loop L3: g is allocated VWRm and 4 words and f is allocated VWRn and 4 words; $m \neq n$.

This allocation process decides how much data needs to be transferred and when it needs to be transferred from the second level of memory units, e.g. SRAM, to the third level of memory units, e.g. VWRs. The precise schedule of the transfers is still not fixed. This allows the freedom for the next process (layout locality) to explore the best layout for the different data in the SPM and also in the VWRs.

In the subsequent line-level layout locality process, the final layout of the data elements would be decided. The original data layout is as follows:

| A[0] | A[1] | A[2] | A[3] |
|------|------|------|------|
| A[4] | A[5] | A[6] | A[7] |
| B[0] | B[1] | B[2] | B[3] |
| B[4] | B[5] | B[6] | B[7] |
| . | . | . | . |
| . | . | . | . |
| G[4] | G[5] | G[6] | G[7] |

The above data layout in the second level of memory units, e.g. SRAM, would be extremely suboptimal for the proposed allocation in the third level of memory units, e.g. VWR. Therefore, the line-level layout locality would do another data-layout as follows:

| A[0] | A[1] | E[0] | E[1] |
|------|------|------|------|
| A[2] | A[3] | E[2] | E[3] |
| B[0] | B[1] | C[0] | C[1] |
| B[2] | B[3] | C[2] | C[3] |
| . | . | . | . |
| . | . | . | . |
| G[4] | G[5] | G[6] | G[7] |

In the first two lines can be seen that A and E are on a same line as in L2. They are allocated to the same VWR1, with 2 locations for each of the arrays. This provides reduced loads during L2.

In the third and fourth line can be seen that B and C are allocated to the same line, but still can be read/written on two different VWRs. This reduces net memory required.

In the last line can be seen that G gets complete lines of its own, as it gets four words in VWR2.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope. Functionality may be added or deleted from the block diagrams and operations may be interchanged among functional blocks. Steps may be added or deleted to methods described within the scope of the present invention.

What is claimed is:

1. A method of converting application code into optimized application code or into execution code suitable for execution on a computation engine with an architecture comprising at least a first and a second level of memory units, the method comprising:
   obtaining application code, the application code comprising data transfer operations between the levels of memory units; and
   converting at least a part of the application code, the converting further comprising:
      scheduling of data transfer operations from a first level of memory units to a second level of memory units such that accesses of data accessed multiple times are brought closer together in time than in the original code; and
      after the scheduling of the data transfer operations, deciding on layout of the data in the second level of memory units to improve the data layout locality such that data which is accessed closer together in time is also brought closer together in the layout than in the original code,
   wherein the scheduling of data transfer operations does not decide on the internal organization of at least some of the data transferred, hence fixing the scheduling of data transfer operations only partially while also partially fixing the placement of all the data transferred, thereby providing freedom to the deciding of data layout.

2. The method according to claim 1, wherein the deciding of data layout uses at least part of the additional freedom provided by the scheduling of data transfer operations.

3. The method according to claim 1, wherein the scheduling of data transfer operations provides a plurality of possible schedules of data transfer operations, and the deciding of data layout further comprises selecting some of the schedules of the data transfer operations.

4. The method according to claim 1, wherein the decision on the internal organization of at least some of the data transferred is based on a cost function.

5. The method according to claim 4, wherein a polyhedral model is used for the code, and the cost function is built with values extracted from the polyhedral model.

6. The method according to claim 5, wherein the values represent data dependencies and/or data reuse.

7. The method according to claim 1, wherein data accessed comprises at least a first and a second group of data and the data layout is performed on these groups of data.

8. The method according to claim 7, the architecture comprising a scratch pad memory (SPM), a cache or a very wide register (VWR) having a width, wherein a group of data comprises at least one line of data having the width of the SPM, the cache or the VWR.

9. The method according to claim 7, the architecture comprising at least one functional unit having a width, wherein a group of data comprises at least one word having the width of functional unit.

10. The method according to claim 7, the architecture comprising at least one functional unit having a width, wherein a group of data comprises at least one sub-word, the width of the functional unit and the sub-words being such that multiple sub-words operate in parallel in the functional unit.

11. The method according to claim 1, wherein the converting of application code further comprises, before the scheduling of data transfer operations, improving parallelism of the data transfers between the first and the second levels of memory units.

12. The method according to claim 11, wherein the improving of parallelism of the data transfers between the first and the second levels of memory units is based on a cost function.

13. The method according to claim 1, wherein the first level of memory units is a higher level memory unit than the second level of memory units.

14. The method according to claim 13, the architecture further comprising a third level of memory units, the third level of memory units being lower level than the second level of memory units, wherein the converting of application code is first performed between the first and second level of memory units, and is thereafter performed between the second and third level of memory units.

15. The method according to claim 14, wherein the converting of application code further comprises, before the converting of data transfer operations between the second and the third levels, improving parallelism of the data transfers between the second and the third levels of memory units.

16. The method according to claim 15, wherein the improving of parallelism of the data transfers between the second and third levels of memory units is based on a cost function.

17. A non-transitory computer-readable medium having stored therein a program which, when being executed by a computer, is configured to perform the method of claim 1.

18. A pre-compiler comprising a processor for converting application code into optimized application code for execution on a computation engine with an architecture comprising at least a first and a second level of memory units, the pre-compiler comprising:
   a receiving module configured to receive application code, the application code comprising data transfer operations between the levels of memory units; and
   a converting module configured to convert at least part of the application code, the converting module comprising:
      a scheduling module configured to schedule data transfer operations from a first level of memory units to a second level of memory units such that accesses of data accessed multiple times are brought closer together in time than in the original code; and
      a deciding module configured to decide layout of the data in the second level of memory units such that accesses of data which is accessed closer together in time are also brought closer together in the layout than in the original code, wherein the deciding of layout is performed after the scheduling of data transfer operations,
   wherein the scheduling module does not decide on the internal organization of at least some of the data transferred, hence fixing the scheduling of data transfer operations only partially while also partially fixing the placement of all the data transferred, thereby providing freedom to the deciding module, wherein the modules are executed by a processor.

19. A pre-compiler comprising a processor, wherein the pre-compiler is executed by a processor, for converting application code into optimized application code for execution on a computation engine with an architecture comprising at least a first and a second level of memory units, the pre-compiler comprising:
- means for receiving application code, the application code comprising data transfer operations between the levels of memory units; and
- means for converting at least part of the application code, the means for converting comprising:
  - means for scheduling data transfer operations from a first level of memory units to a second level of memory units such that accesses of data accessed multiple times are brought closer together in time than in the original code; and
  - means for deciding on layout of the data in the second level of memory units such that accesses of data which is accessed closer together in time are also brought closer together in the layout than in the original code, wherein the deciding of layout is performed after the scheduling of data transfer operations,
  - wherein the means for scheduling data transfer operations does not decide on the internal organization of at least some of the data transferred, hence fixing the scheduling of data transfer operations only partially while also partially fixing the placement of all the data transferred, thereby providing freedom to the means for deciding on layout of the data in the second level of memory units.

20. A compiler stored in non-transitory computer readable medium, wherein the compiler is executed by a processor, for converting application code into execution code suitable for execution on a computation engine with an architecture comprising at least a first and a second level of memory units, the compiler comprising:
- a receiving module configured to receive application code, the application code comprising data transfer operations between the levels of memory units; and
- a converting module configured to convert at least part of the application code, the converting module comprising:
  - a scheduling module configured to schedule data transfer operations from a first level of memory units to a second level of memory units such that accesses of data accessed multiple times are brought closer together in time than in the original code; and
  - a deciding module configured to decide layout of the data in the second level of memory units such that accesses of data which is accessed closer together in time are also brought closer together in the layout than in the original code, wherein the deciding of layout is performed after the scheduling of data transfer operations,
  - wherein the scheduling module does not decide on the internal organization of at least some of the data transferred, hence fixing the scheduling of data transfer operations only partially while also partially fixing the placement of all the data transferred, thereby providing freedom to the deciding module.

21. A compiler stored in non-transitory computer readable medium, wherein the compiler is executed by a processor, for converting application code into execution code suitable for execution on a computation engine with an architecture comprising at least a first and a second level of memory units, the compiler comprising:
- means for receiving application code, the application code comprising data transfer operations between the levels of memory units; and
- means for converting at least part of the application code, the means for converting comprising:
  - means for scheduling data transfer operations from a first level of memory units to a second level of memory units such that accesses of data accessed multiple times are brought closer together in time than in the original code; and
  - means for deciding on layout of the data in the second level of memory units such that accesses of data which is accessed closer together in time are also brought closer together in the layout than in the original code, wherein the deciding of layout is performed after the scheduling of data transfer operations,
  - wherein the means for scheduling data transfer operations does not decide on the internal organization of at least some of the data transferred, hence fixing the scheduling of data transfer operations only partially while also partially fixing the placement of all the data transferred, thereby providing freedom to the means for deciding on layout of the data in the second level of memory units.

* * * * *